Oct. 23, 1956  O. M. LEWIS ET AL  2,767,781
ROLLER TYPE DEVICE FOR REMOVING A TIRE FROM A VEHICLE WHEEL
Filed May 25, 1953  3 Sheets-Sheet 3

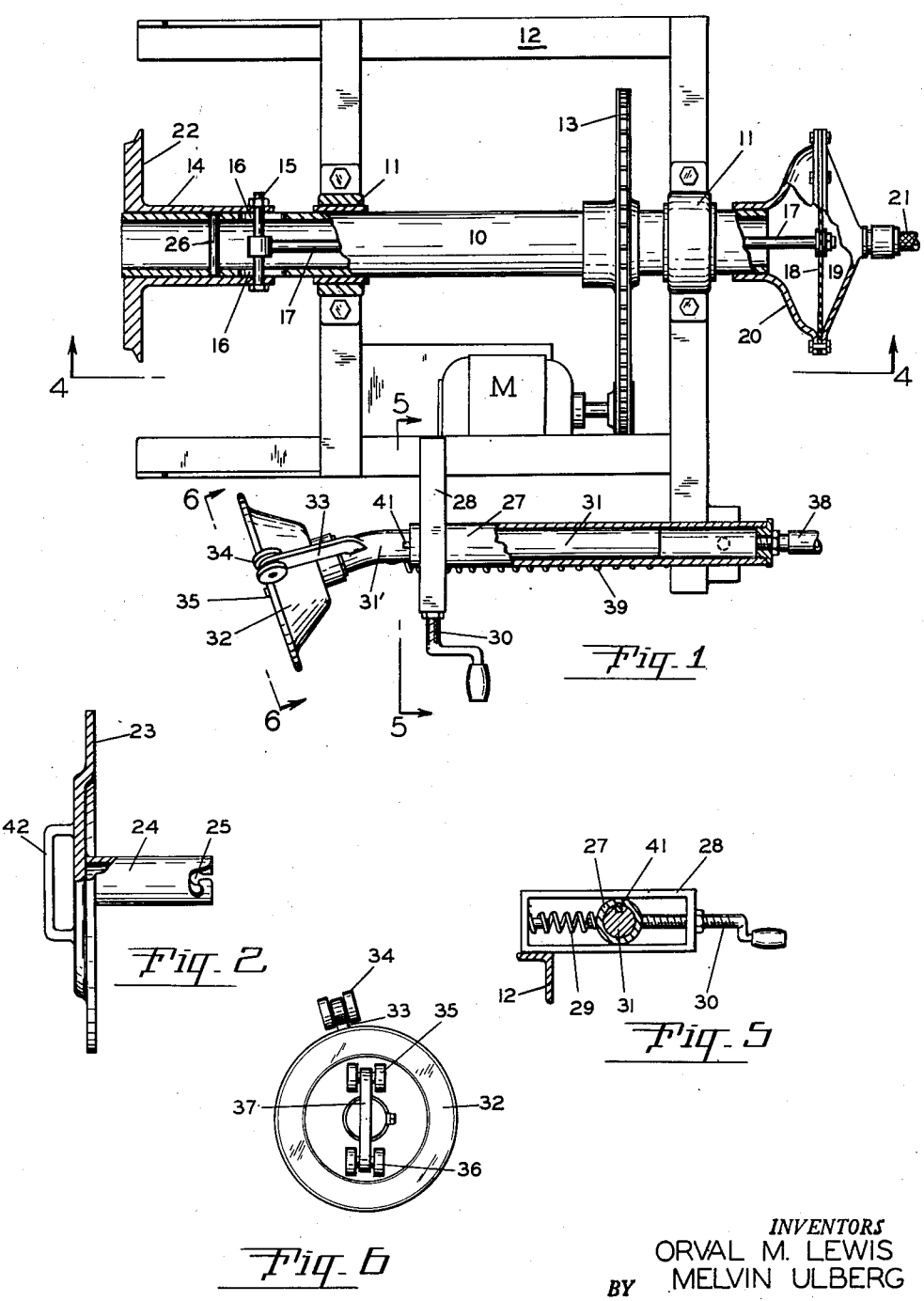

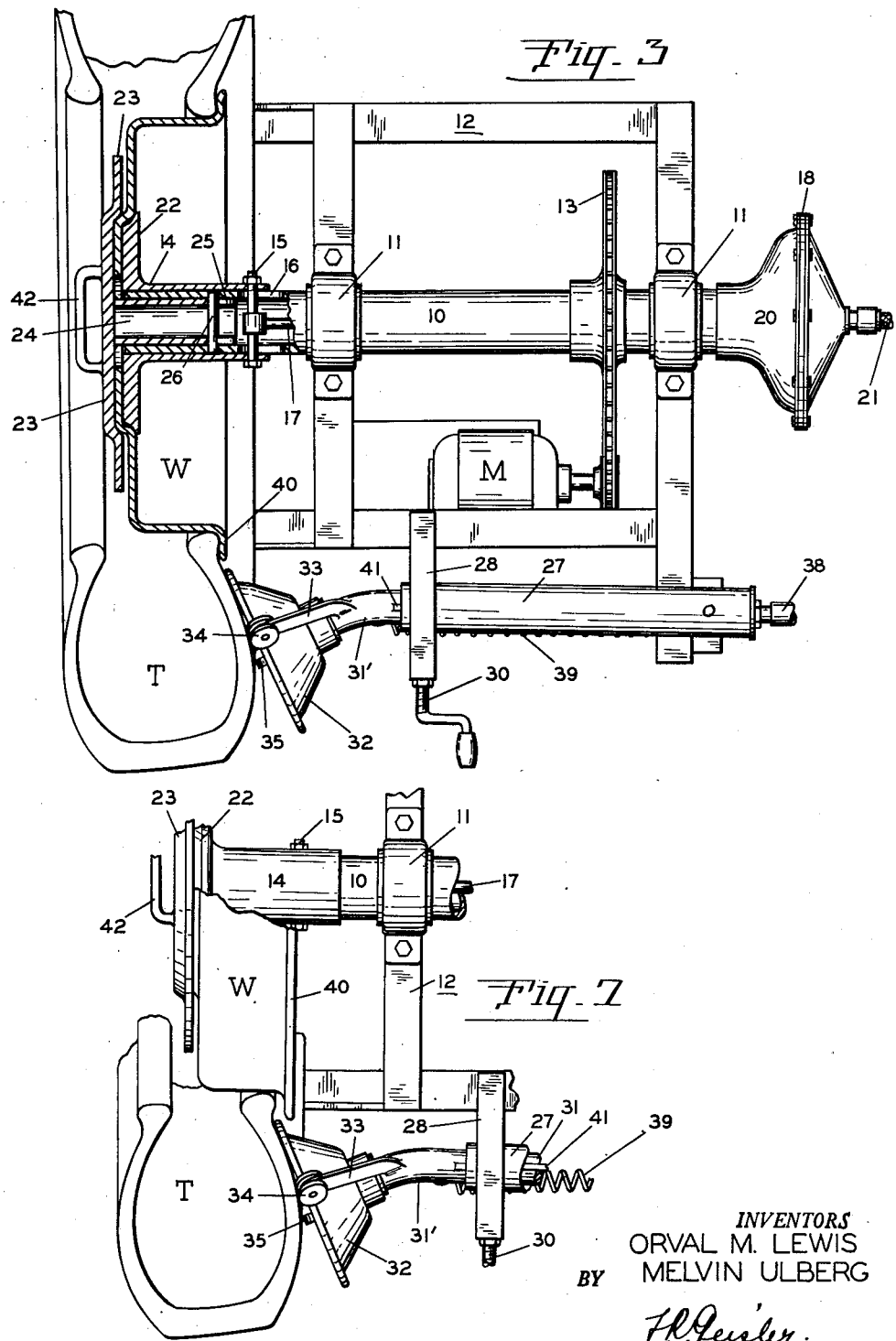

INVENTORS
ORVAL M. LEWIS
MELVIN ULBERG
By F. R. Geisler,
ATTORNEY

United States Patent Office 2,767,781
Patented Oct. 23, 1956

2,767,781

ROLLER TYPE DEVICE FOR REMOVING A TIRE FROM A VEHICLE WHEEL

Orval M. Lewis and Melvin Ulberg, Sweet Home, Oreg.; said Ulberg assignor to said Lewis Application May 25, 1953, Serial No. 357,108

4 Claims. (Cl. 157—1.24)

This invention relates to the removal of tires from vehicle wheels, and more specifically, relates to the forcible removal of tires from the wheel rims of heavy duty vehicles such as trucks, busses and the like, and also from aeroplane landing gear wheels.

As is well known, when the tires of such vehicles have been in service on the wheel rims over a long period, the edges or beads of the tires often become firmly stuck or "frozen" to the wheel rims on the rim flanges with which they are in engagement, due to rust or other causes, so that considerable force is required to free the tires from the rims.

It is customary on heavy duty vehicle wheels to have a removable ring on the outer face of the wheel to serve as the engaging means for the outer bead or rim of the tire and to have an annular rim flange on the inside face of the wheel to hold the corresponding inside bead of the tire. It is the difficulty of loosening the tire from this inside rim flange of the wheel which is the main cause of the trouble involved in the removal of a tire from a wheel.

While several devices have previously been developed for forcing a tire loose from the wheel rim in the tire-removing operation, these devices for the most part are either not practical or are complicated and expensive, and as a result the customary practice of beating the tires with mallets to loosen them from the rims and then prying them off from the wheel rims by means of a flat bar or similar tool is still being very generally followed. This customary procedure, in addition to being laborious and slow, often admittedly results in injury to the tire which is being removed.

An object of the present invention is to provide an improved device for forcibly removing a tire from a wheel rim which will avoid any possibility of injury to the tire during such removing operation.

Another object of the invention is to provide an improved tire removing device by means of which the tire will be loosened from the rim of the wheel and its removal facilitated within a minimum period of time, thus greatly reducing the time and labor generally required for such work.

A further object of the invention is to provide a tire removing device which will be simple and practical in construction and which will be easy to operate and will not necessitate any particular skill on the part of the operator.

The manner in which these objects and other objects are attained with our improved tire removing device, the construction of the same, and the manner of its operation, will be readily understood from the following brief description in which reference is made to the accompanying drawings.

In the drawings:

Fig. 1 is a plan view of the device, partly in section, with the clamping element for the vehicle wheel removed;

Fig. 2 is an elevation, partly in section, of the wheel clamping element by itself;

Fig. 3 is a plan view similar to Fig. 1, but showing the vehicle wheel clamped in position on the device in readiness for the tire removing operation;

Fig. 6 is a fragmentary elevation taken on line 6—6 of Fig. 1;

Fig. 7 is a fragmentary plan view showing the thrusting wheel and rollers in engagement with the rim and wall of the tire prior to the positioning of the thrusting wheel closer to the vehicle wheel and in between the vehicle rim flange and the adjacent bead or rim of the tire; and Fig. 8 is a sectional view taken on the axis of the thrusting wheel, drawn to a larger scale, and showing the tire-engaging rollers and the roller mountings and the mounting for the thrust wheel.

Figure 4:
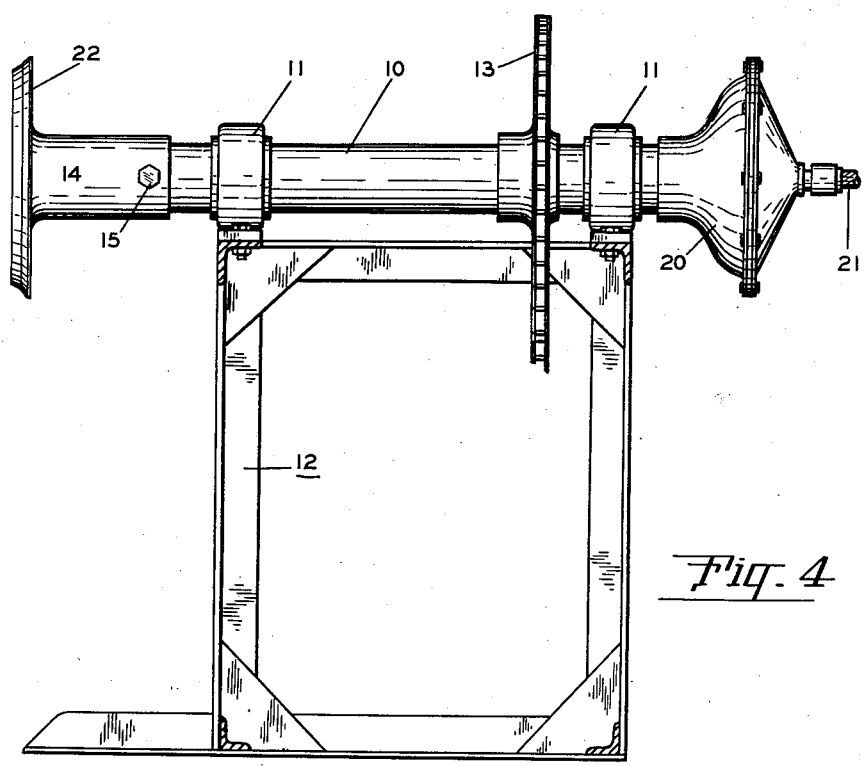
Fig. 4 is a sectional elevation taken on line 4—4 of Fig. 1.

Referring first to Figs. 1 and 4, a cylinder 10 is rotatably mounted in suitable journals 11, 11 supported on the top of a base frame structure indicated in general by the reference character 12. A sprocket wheel 13 is secured on the cylinder 10 and has a chain and pulley connection with the motor M by which rotation is imparted to the cylinder 10 when desired.

A sleeve 14 is mounted on one end of the cylinder 10 and is axially slidable for a restricted distance thereon. A bar 15, secured to the sleeve 14, and extending diametrically through the sleeve, passes through a pair of opposite longitudinally-extending slots 16, 16 in the cylinder 10. A rod 17 has one end attached to the bar 15 and the opposite end connected to a diaphragm 18 which is located in an air chamber 19 within the housing 20 mounted on the end of the cylinder 10. The air chamber 19 is connected by a hose 21 and related suitable means, including valves (not shown) to a source of compressed air (not shown). Thus movement of the diaphragm 18 produced by air pressure in the chamber 19 produces axial movement of the sleeve 14.

The sleeve 14 carries an integral disc flange 22 of the proper size to fit into and against the inside face of the vehicle wheel when the tire is to be removed from the wheel. A wheel clamping plate 23 (Fig. 2), of the proper size and shape to engage the outside face of the vehicle wheel, is secured on a short co-axial tube 24, the outside diameter of the tube 24 being approximately equal to the inside diameter of the cylinder 10. A pair of notches, one of which is shown at 25 in Fig. 2, are formed in the end of the tube 24 and are so arranged as to be capable of locking engagement with a bar 26 secured in the cylinder 10 and thus provide a bayonet type of locking means for holding the tube 24 and clamping plate 23 in place on the end of the cylinder 10. A handle 42 is secured to the outside of the clamping plate 23 for convenience in mounting the clamping plate on the cylinder 10 or in demounting it from the cylinder 10.

When the tire is to be removed from a vehicle wheel the outside tire retaining rim ring is removed from the outer face of the wheel and the vehicle wheel W (see Fig. 3) is moved into axial alignment with the cylinder 10 and into engagement with the disc flange 22 of the sleeve 14. Then the clamping plate 23 is set in place by inserting the tube 24 through the center opening in the wheel and into the end of the cylinder 14 and locking the tube 24 to the bar 26. When the outside clamping plate has been locked in place in this manner compressed air is allowed to pass into the diaphragm chamber in the housing 20 and the resulting movement of the diaphragm causes the sleeve 14 and its disc 22 to move outwardly until the vehicle wheel is tightly clamped between the disc flange 22 and the outer clamping plate 23 as illustrated in Fig. 3. The vehicle wheel is now ready for the tire removing operation.

A hydraulic cylinder 27 is pivotally secured at one end to the frame structure 12 for movement in a horizontal plane. The opposite or forward end of the hydraulic cylinder 27 extends through, and is laterally movable in, a housing 28 which is secured on the frame structure 12. A spring 29 (Fig. 5) within the housing 28, is held under compression between one side of the hydraulic cylinder 27 and the corresponding end of the housing 28. An adjustable screw and crank 30, mounted in the opposite end of the housing 28, engages the other side of the cylinder 27. Thus the hydraulic cylinder 27 can be swung slightly laterally by manipulation of the crank screw 30.

The piston 31 (Fig. 1) for the hydraulic cylinder 27 has an outer end portion 31' which is formed with an angular bend with respect to the main portion of the piston, as shown in Figs. 1, 3 and 7. A thrusting wheel 32 is rotatably mounted on the end portion 31', the mounting for this thrusting wheel being shown in Fig. 8. A bracket 33, formed integral with or welded to the end portion 31', supports a pair of tire engaging rollers 34 at its outer end, which rollers are positioned adjacent the outer periphery of the thrusting wheel 32 (Figs. 6 and 8). A double set of similar rollers 35 and 36 are mounted on a bracket 37 which is rigidly secured in any suitable manner on the end of the end portion 31' and within the recessed part of the wheel 32. As shown in Fig. 8, the rollers 34, 35 and 36 extend slightly beyond the plane of the forward or thrusting face of the wheel 32, the reason for which will presently be apparent.

Hydraulic fluid from a suitable source (not shown) is delivered into the rear end of the cylinder 27 through a flexible tube 38 (Figs. 1 and 3). The delivery of the hydraulic fluid into the cylinder 27 under sufficient pressure produces the forward movement of the hydraulic piston (that is, movement from right to left as viewed in Figs. 1 and 3), and with the forward movement of the piston the thrust wheel 32 and rollers 34, 35 and 36 are consequenly moved forwardly into engagement with the tire. Upon release of the hydraulic pressure in the hydraulic cylinder 27 a coil spring, indicated at 39 in Figs. 1 and 3, which has one end attached to a bracket on the outer end portion 31' of the piston and the other end attached to the supporting frame structure 12, returns the piston, thrust wheel and tire engaging rollers to the right or starting position.

The angularity in the outer end portion 31' of the hydraulic piston is such that the forward face of the thrust wheel 32, when brought into contact with the tire T to be removed, will come into engagement with the tire first at that portion of the tire which is adjacent the inner rim flange 40 of the vehicle wheel W.

The operation of the device is as follows: When the vehicle wheel W, from which the tire T is to be removed, is securely clamped in position on the end of the cylinder 10, as previously described, the position of the hydraulic cylinder 27 is adjusted, if necessary, so that the thrust wheel 32 will be substantially in the relative location illustrated in Fig. 3. Then the motor is operated to cause the cylinder 10, and with it the vehicle wheel W and tire T, to be rotated slowly, and hydraulic fluid under pressure is allowed to pass into the rear of the cylinder 27 so as to thrust the piston and thrust wheel 32 and the associated rollers against the tire T. As the thrust wheel 32 pushes against that portion of the tire which is adjacent the rim 40 of the wheel W, the tire rim is forced away from the rim flange of the vehicle wheel, whereupon the thrust wheel 32 is moved into the space between the rim flange 40 and the tire bead or rim by further adjustment of the hydraulic cylinder through the crank screw 30 (see Fig. 7). The thrust wheel 32 is maintained in this position while the vehicle wheel and tire are slowly rotated, until as a result the entire rim or bead of the tire T has been loosened from the vehicle wheel rim flange 40.

Due to the angularity of the axis on which the thrust wheel 32 rotates, with respect to the axis of rotation of the vehicle wheel and tire T, the thrust wheel 32 engages the tire only near the rim portion, and, due to the fact that the thrust wheel is free to rotate and is rotated by its contact with the tire, practically no rubbing or wearing of the tire surface due to the contact with the thrust wheel occurs. In order to minimize the surface area of the tire which is engaged by the thrust wheel at any moment, since the resiliency of the tire wall would cause greater surface contact to take place with the face of the thrust wheel under the thrusting pressure, the rollers 34, 35 and 36 are so arranged as to engage the wall of the tire in the area beyond the rim, in which area rubbing engagement between the tire and the thrust wheel would otherwise be likely to occur.

Figure 5:
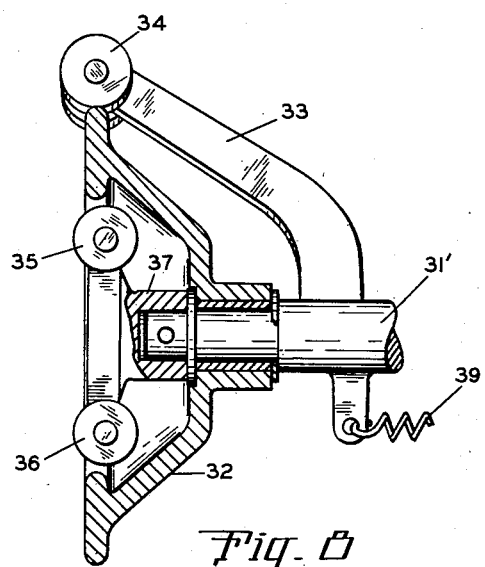
Fig. 5 is a fragmentary section taken on line 5—5 of Fig. 1.

Since the brackets on which the rollers 34, 35 and 36 are carried are rigidly secured to the end portion 31' of the hydraulic piston, and since the piston is held against rotation by suitable means, such as a key and key slot indicated at 41 in Fig. 5, while the thrust wheel 32 is free to be rotated by engagement with the tire rim, there is no possibility of any injury to the tire, even when a very strong thrusting force is required to free the tire rim from the wheel flange. This fact together with the fact that the loosening of the tire rim is obtained with a minimum expenditure of time and effort on the part of the operator, are important features in our invention.

Various modifications could be made in the apparatus which we have illustrated and described without departing from the principle of our invention and it is not our intention to restrict our invention exactly to the described structure or to limit the scope of our invention otherwise than as set forth in the claims.

We claim:

1. In a device for removing a tire from a vehicle wheel, a rotatable support for said vehicle wheel, means for securing said wheel to said rotatable support, means for rotating said rotatable support and therewith said vehicle wheel, a tire-thrusting wheel mounted on an axis extending in a direction obliquely away from the axis of said rotatable support, said thrusting wheel rotatably carried on a shaft so located that the periphery of said thrusting wheel will normally be spaced a short distance from the periphery of the inside rim flange of said vehicle wheel when said vehicle wheel is secured on said rotatable support, adjustable supporting means for said thrusting wheel shaft, whereby said thrusting wheel may be moved into peripheral contact with said vehicle wheel, a tire-engaging roller adjacent to and extending a short distance beyond the plane of the forward face of said thrusting wheel, the axis of said roller extending in a radial direction with respect to the axis of rotation of the rotatable support, a bracket mounting for said roller secured to said thrusting wheel shaft, and additional means for thrusting said shaft and said thrusting wheel and said roller towards the plane of rotation of said vehicle wheel, whereby a portion of the outer face of said thrusting wheel will have thrusting contact with an inner rim portion of the tire on said vehicle wheel, while said roller will engage the wall of said tire a short distance outwardly from said inner rim, in the tire removing operation.

2. A device of the character described for removing a tire from a vehicle wheel including a supporting structure, a member rotatably supported by said structure, means for clamping said vehicle wheel on said member, means for rotating said member and therewith said vehicle wheel, a tire-thrusting wheel mounted on an axis extending in a direction obliquely away from the axis of said member, said thrusting wheel rotatably carried on a shaft so located that the periphery of said thrusting wheel will normally be spaced a short distance from the periphery of the inside rim flange of said vehicle wheel when said vehicle wheel is secured on said member, adjustable supporting means on said supporting structure for said thrusting wheel shaft, whereby said thrusting wheel may be moved into peripheral contact with said vehicle wheel, tire-engaging rollers adjacent to, and extending a short distance beyond the plane of the forward annular face of said thrusting wheel, the axes of said rollers extending in a radial direction with respect to the axis of rotation of the rotatable support, bracket mountings for said rollers secured to said thrusting wheel shaft, and additional means for thrusting said shaft and said thrusting wheel and said rollers towards the plane of rotation of said vehicle wheel, whereby a portion of the outer face of said thrusting wheel will have thrusting contact with an inner rim portion of the tire on said vehicle wheel, while said rollers will engage the wall of said tire a short distance outwardly from said inner rim, in the tire removing operation.

3. In a device of the character described for removing a tire from a vehicle wheel, a supporting frame, a vehicle wheel-supporting assembly rotatably mounted on said frame, means for securing said vehicle wheel on said assembly, means for rotating said assembly and therewith said vehicle wheel, a tire-thrusting wheel having a front face surface and a relatively thin periphery, said thrusting wheel rotatably mounted on a shaft on an axis extending obliquely outwardly towards the plane of rotation of said vehicle wheel and tire and so positioned that said front face of said tire-thrusting wheel will be opposed to the side wall of said tire near the rim portion of said tire wall, means for thrusting said shaft and therewith said tire-thrusting wheel towards said tire, the angularity of the axis of said tire-thrusting wheel with respect to said vehicle wheel being such that when said tire-thrusting wheel is brought into contact with said tire wall only a portion of said front face surface will engage said tire wall, and separate manually operated means for changing the angularity of said tire-thrusting wheel axis with respect to said vehicle wheel and for moving said tire-thrusting wheel inwardly towards the axis of rotation of said vehicle wheel and tire and moving said rim of said tire-thrusting wheel in between the vehicle wheel rim and the rim portion of said tire wall as said tire-thrusting wheel is forcibly engaged with said tire.

4. In a device of the character described for removing a tire from a vehicle wheel, a supporting frame, a vehicle wheel-supporting assembly rotatably mounted on said frame, means for securing said vehicle wheel on said assembly, and means for rotating said assembly and therewith said vehicle wheel, a tire-thrusting wheel having an annular, substantially flat front face surface and a relatively thin periphery, said thrusting wheel rotatably mounted on a shaft on an axis extending obliquely outwardly towards the plane of rotation of said vehicle wheel and tire and so positioned that said front face of said tire-thrusting wheel will be opposed to the side wall of said tire near the rim portion of said tire wall, means for thrusting said shaft and therewith said tire-thrusting wheel towards said tire, the angularity of the axis of said tire-thrusting wheel with respect to said vehicle wheel being such that when said tire-thrusting wheel is brought into contact with said tire wall only a portion of said front face surface will engage said tire wall, means for changing the angularity of said shaft with respect to said vehicle wheel and for moving said tire-thrusting wheel inwardly towards the axis of rotation of said vehicle wheel and tire and moving said rim of said tire-thrusting wheel in between the vehicle wheel rim and the rim portion of said tire wall as said tire-thrusting wheel is forcibly engaged with said tire, and means for confining the contact of said tire-thrusting wheel with said tire wall to a small area on the front face and rim of said tire-thrusting wheel regardless of the thrusting pressure exerted by said tire-thrusting wheel against said tire wall, whereby to prevent excessive wear on said tire wall.

References Cited in the file of this patent

UNITED STATES PATENTS

| | | |
|---|---|---|
| 1,416,094 | Krauska | May 16, 1922 |
| 1,498,299 | Rollins | June 17, 1924 |
| 1,538,875 | Stevens | May 19, 1925 |
| 1,959,655 | Brouhard | May 22, 1934 |
| 2,241,056 | Chilton | May 6, 1941 |
| 2,470,534 | Thomas | May 17, 1949 |
| 2,546,988 | Eberly | Apr. 3, 1951 |
| 2,569,788 | Weaver | Oct. 2, 1951 |
| 2,581,569 | Zugaro et al. | Jan. 8, 1952 |

FOREIGN PATENTS

| | | |
|---|---|---|
| 578,761 | Great Britain | July 10, 1946 |